United States Patent [19]

Walker

[11] 4,373,689
[45] Feb. 15, 1983

[54] TWO-AXIS RUDDER TRIM FOR AIRCRAFT

[76] Inventor: Robert A. Walker, 17130 Roscoe Blvd., Los Angeles, Calif. 91325

[21] Appl. No.: 169,405

[22] Filed: Jul. 16, 1980

[51] Int. Cl.³ .............................................. B64C 5/10
[52] U.S. Cl. ........................................ 244/87; 244/91
[58] Field of Search .................. 244/3.24, 75 R, 87, 244/88, 91, 220, 225

[56] References Cited

U.S. PATENT DOCUMENTS

| 1,883,758 | 10/1932 | Brandt | 244/3.24 |
| 2,074,765 | 3/1937 | Adams | 244/88 |
| 2,999,657 | 9/1961 | Clark | 244/91 |
| 3,442,472 | 5/1969 | Kalina | 244/87 |
| 4,264,043 | 4/1981 | Walker | 244/91 |

Primary Examiner—Charles E. Frankfort
Attorney, Agent, or Firm—Christie, Parker & Hale

[57] ABSTRACT

A swivel-mounted trim element of a predetermined configuration for use with aircraft for the purpose of providing additional control in flight. The trim element is mounted immediately to the rear of a channel-shaped stabilizer mounted externally or molded into the fuselage of an aircraft and is especially suited for small aircraft, particularly those having V-surface tail assemblies. The trim element configuration is generally right-angled with the base portion being additionally formed to have a downwardly-canted portion at the leading edge and an inwardly-canted portion at the trailing edge. In operation, the trim element provides two-axis rudder trim about both the pitch and yaw axis.

1 Claim, 6 Drawing Figures

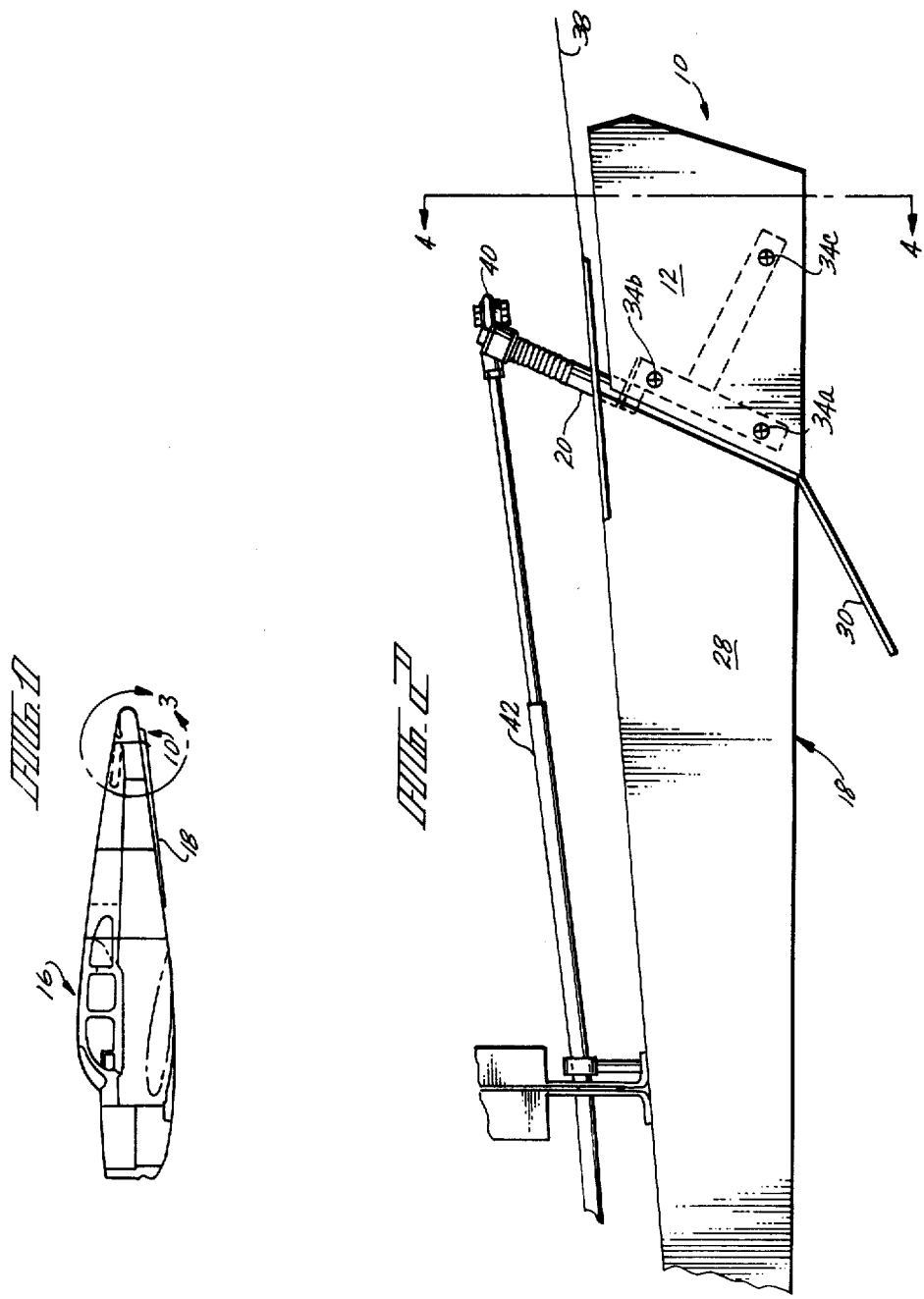

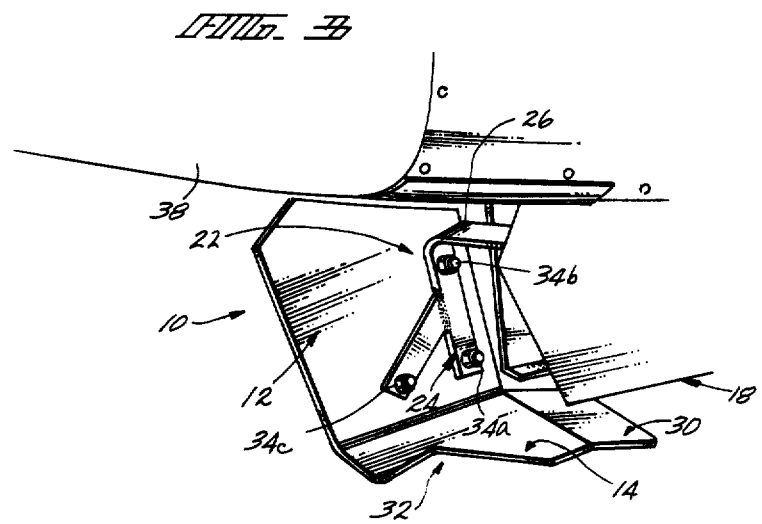
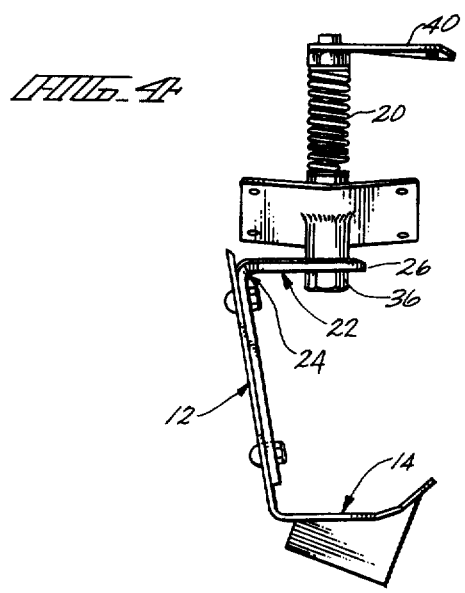

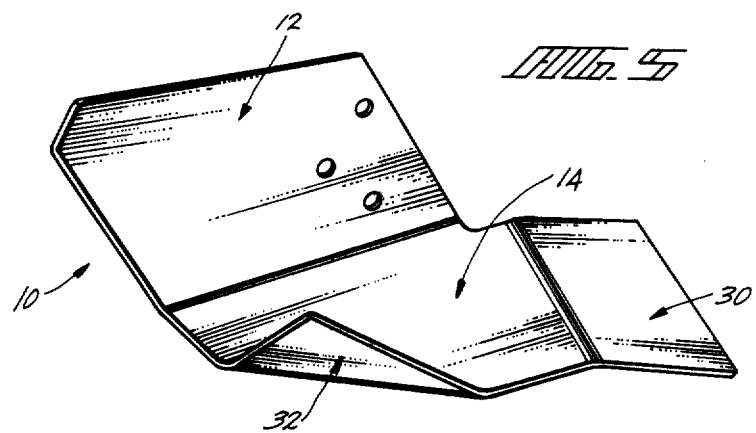
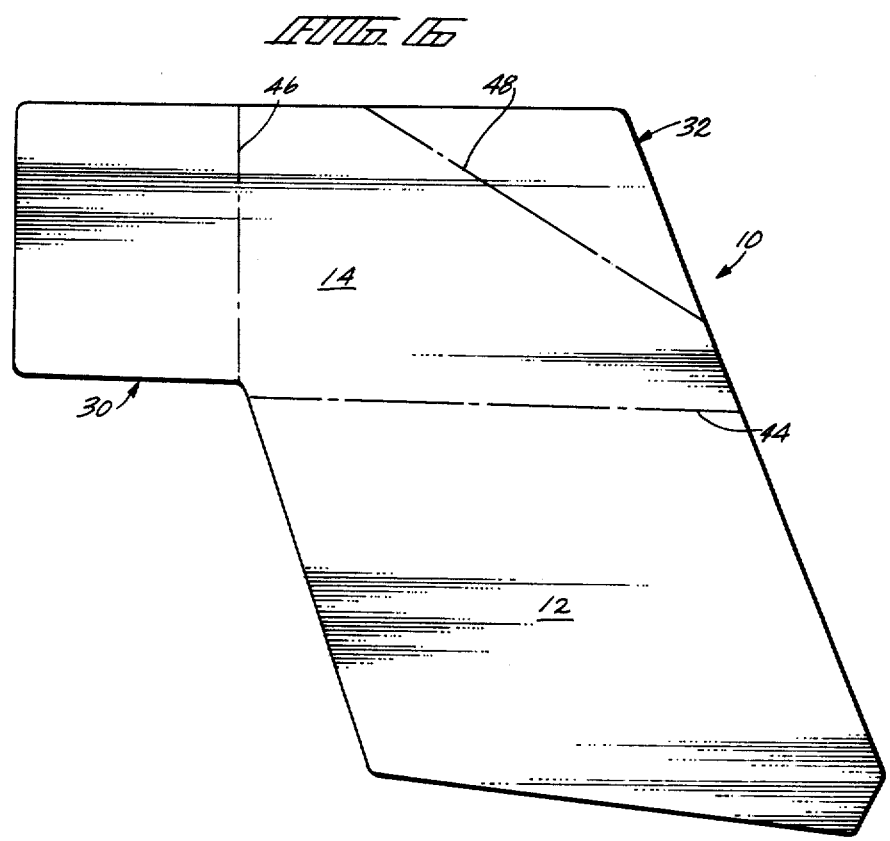

TWO-AXIS RUDDER TRIM FOR AIRCRAFT

BACKGROUND OF THE INVENTION

The present invention relates to trim elements for aircraft and, in particular, to a right-angle-shaped plate to be attached or built into the fuselage of an aircraft, particularly at the rear of a stabilizer channel.

In certain types of light aircraft, such as, for example, Beechcraft Bonanzas, the design of the craft calls for stabilizers at the rear of the craft which are inclined upwardly from both sides at an angle to the horizontal. This is in contrast with more conventional construction of this portion of aircraft in which one vertical and two horizontal stabilizers are provided.

Although the Bonanza is a well-designed, high-performance aircraft, attitude instability and a certain tendency to spiral divergence are characteristics of this design, due in part to the V-shaped configuration of the rear stabilizers. Pilots encounter problems in maintaining the aircraft level in cruising situations and significant rudder control requirements at takeoff and landing. Aircraft of this design configuration are known to be demanding to fly and unforgiving of pilot mistakes.

Because the plane has a tendency to fall off to the left and enter a divergent spiral, constant pilot diligence is required to monitor the plane's attitude in flight. It is believed that spiral divergence tendency, coupled with the plane's ability to gain speed very rapidly, sometimes results in "panic" application of control functions by pilots at high speed, which stresses the structural capability of the craft beyond its design limits and can cause wing or tail structures to crack and/or break away.

SUMMARY OF THE INVENTION

The present invention provides a two axis trim element for aircraft comprising a rotatable shaft extending from the rear portion of the underside of the aircraft and an elongated, generally horizontal surface element having a downwardly-canted tab portion forming the leading edge thereof, extending along the longitudinal axis of the aircraft, which is connected to the rotatable shaft by an elongated vertical surface element attached at the port side of the horizontal surface element. Means for securing the vertical surface element to the shaft for swivelly mounting the trim element is provided, and control means extend between the shaft and an operator's control position in the aircraft for enabling an operator to adjust the angle of attack of the trim element. An upwardly-canted portion is formed into the horizontal surface toward the rear of the starboard side thereof opposite the vertical surface element, said canted portion being angled obliquely relative to the direction of elongation of the surface whereby the element functions to trim the aircraft about the pitch and yaw axis.

In a preferred embodiment of the invention, the trim element is utilized with a channel-shaped stabilizer, which is formed into or attached at the underside of the aircraft extending rearwardly toward the tail. Such a channel-shaped stabilizer is described in more detail in a copending application, Ser. No. 915,527, filed June 14, 1978 now U.S. Pat. No. 4,264,043. The trim element is mounted immediately to the rear of the trailing edge of the channel-shaped stabilizer and is eccentrically mounted relative thereto such that the vertical surface element is generally aligned with the left or port side of the stabilizer when looking toward the nose of the aircraft. The control cable extends from the operator's position to the shaft to enable the operator to rotate the shaft and swivel the trim element relevant to the channel between a position wherein the trim element is essentially aligned with the channel to a position wherein the trim element is swiveled to an angle of approximately 45° with respect to the channel.

The most important advantages resulting from the trim element of the present invention are a significant contribution toward maintaining the desired attitude of the aircraft and control of the aircraft in flight, both in takeoff and in cruising attitudes. Upon takeoff, the trim element is sharply angled with respect to the channel to substantially reduce the right rudder requirements normally attendant upon takeoff. As the plane climbs out of its takeoff attitude and begins to cruise, depending upon the cruising speed and power setting chosen by the pilot, the trim element is adjusted to a position of slight angulation with respect to the channel. In cruising, if the plane tends to nose down, or the tail tends to drift to the right, the trim element immediately begins to function, pushing the nose of the plane up and the tail toward the left. In short, the trim element forces the aircraft back to the position and attitude to which it was trimmed.

When used in conjunction with the channel-shaped stabilizer referred to above, the trim element utilizes the "firehose" effect of the airstream rushing down the channel of the channel-shaped stabilizer and impacting on the vertical surface, the downwardly-canted tab portion at the leading edge of the horizontal surface and the upwardly-canted portion at the trailing edge of the horizontal surface.

The trim element of the present invention thus provides a control element which is capable of trimming conventional as well as "V tail" aircraft about two axes. The element first provides a directional capability or yaw control because of the vertical surface portion of the trim element, and, secondly, it provides an attitude-holding capability or pitch control because of the horizontal surface portion of the element. Given the tendency of some aircraft, particularly aircraft using a "V-shaped" tail configuration to slip into a nose-down and left turn attitude leading toward a divergent spiral, the trim element of the present invention provides a control element which resists such tendencies and maintains the aircraft in the attitude to which it is trimmed without constant operator attention.

In terms of specific function, the downwardly-canted tab portion at the leading edge of the horizontal surface is impacted by air moving down the channel-shaped stabilizer. The force of this airflow has the tendency to force the tail of the plane down and the nose up. Likewise, the column of air exiting from the channel-shaped stabilizer impacts on the vertical surface element and on the upwardly-canted portion at the rear edge of the horizontal surface. The first effect of the column of air impacting upon the vertical surface is to push the tail to the left, and this leftward impulse is reinforced by the ricochet effect of air impacting on the upwardly-canted portion of the horizontal control surface and again impacting on the vertical surface.

DESCRIPTION OF THE DRAWINGS

These and other advantages of the invention will be better understood by reference to the figures of the drawings, wherein:

FIG. 1 is an elevation view of an aircraft having the trim element according to the prevent invention attached thereto;

FIG. 2 is a perspective view of the trim element in FIG. 1 taken from the starboard side of the aircraft;

FIG. 3 is a detail elevation view taken along lines 3—3 of FIG. 1 illustrating the control connections extending from the trim element to an operator's position;

FIG. 4 is a sectional elevation view taken along lines 4—4 of FIG. 3 with certain control connections omitted; FIG. 5 is a perspective view of the trim element alone; and FIG. 6 is a plan view of the trim element according to the present invention before forming.

DESCRIPTION OF A SPECIFIC EMBODIMENT

The trim element according to the present invention and its typical locational relationship to an aircraft is shown in FIG. 1 and in further detail in elevation views in FIGS. 2 and 3. Its configuration and relationship to a channel-shaped stabilizer, together with the structure depicting the manner in which the trim element is mounted and controlled, are shown in FIG. 3. As shown, the trim element 10 is generally a right-angle-shaped plate having a vertical surface 12 and a horizontal surface 14. As shown in FIG. 1, it is attached to the underside of an aircraft 16 and is located immediately to the rear of a channel-shaped stabilizer 18, a structure which is described in detail in copending U.S. patent application, Ser. No. 915,527, filed June 14, 1978 now U.S. Pat. No. 4,264,043.

As shown more clearly in FIGS. 2, 3, and 4, trim element 10 is attached to the underside of the hull of aircraft 16 by means of a shaft 20 and an angle-shaped bracket 22. One arm 24 of bracket 22 is attached to vertical surface 12, while the other bracket arm 26 is attached to shaft 20 and secured thereto such that rotation of shaft 20 produces turning or swivelling of trim element 10.

As is seen in FIGS. 1-4, trim element 10 is mounted immediately adjacent the outlet end of channel-shaped stabilizer 18. Vertical surface 12 is attached to bracket 22 such that the surface aligns with side 28 of channel 18 when the trim element 10 is in its neutral or channel-aligned position. Vertical surface 12 extends downwardly from hull 38 of the aircraft a distance which is essentially equal to the length of side 28 at the outlet end of the channel stabilizer 18. A horizontal surface 14 is integrally formed into trim element 10 at an angle of approximately 110° relative to vertical surface 12. Horizontal surface 14 has a width which is approximately equal to the width of the opening at the bottom of channel-shaped stabilizer 18 at the outlet end thereof. This horizontal surface is elongated in configuration in the direction of elongation of the aircraft hull (longitudinal axis) and has a tab portion 30 at the leading edge of horizontal surface extending toward the noze of the airplane. Tab portion 30 is downwardly inclined to the generally horizontal orientation of surface 14 at an angle between approximately 10° and 30°. A free corner 32 at the trailing edge of surface 14 on the side (starboard) thereof opposite the line of connection between surface 12 and surface 14 is canted upwardly at an angle of between approximately 30° and 60°, with the line of bending being oriented obliquely with respect to the direction of elongation of the horizontal surface 14.

As shown in FIG. 3, trim element 10 is in its neutral orientation, the orientation normally assumed by the trim element when the plane is in a cruising attitude. After takeoff, the pilot gradually adjusts the angle of attack of trim element 10 from a selected, relatively sharp, angle (up to approximately 45°) at takeoff to the position corresponding to the proper cruising attitude of the aircraft as shown by the pilot's control instruments in the cockpit. The precise orientation of the trim element depends upon the selected speed of the aircraft and the power setting. Once element 10 is oriented to the cruising position, no further adjustment is made, unless the speed is changed or the aircraft is prepared for landing. In flight, if the aircraft tends to deviate from the attitude to which it is trimmed, the trim element functions to bring it back to its previously-set attitude without the necessity for pilot adjustment of the controls. This is accomplished by the fact that the airstream issuing from stabilizer 18 impacts upon tab portion 30, tending to hold the tail of the aircraft down and resist any tendency of the aircraft to nose down. Likewise, the airstream impacting on vertical surface 12 and ricocheting or bouncing back and forth between bent corner 32 and vertical surface 12 has the tendency to push the tail of the aircraft to the left, resisting any tendency for the tail to drift toward the right. Thus, the trim element 10 controls the attitude of the aircraft about both the pitch and yaw axes. To increase the control effect of trim element 10, and in particular, the contribution of vertical surface 12, shaft 20 is rotated so that the trim element is turned from the neutral position to a position of a greater angled relationship relative to the longitudinal axis of the aircraft as shown in FIG. 2.

The function of the trim element according to the present invention is obtainable with various types of aircraft having both conventional and V-tail configurations, and is normally mounted on the underside of the aircraft in the general vicinity of the tail assembly. In its preferred embodiment, the trim element of the present invention is intended for use with a channel-shaped stabilizer, more fully described in the above-mentioned copending U. S. patent application and currently marketed under the trademark, Airskeg. The controlled column of air created by stabilizer 18 concentrates and directs a column of air onto the control surfaces of trim element 10 to significantly enhance their effect and contribution. When the channel-shaped stabilizer and the trim element of the present invention are used on certain aircraft which tend to exhibit a tendency to slip into a divergent spiral, such as V-tail aircraft, the functioning and impact of the present invention is particularly noticeable and essentially eliminates this tendency. Elimination of this tendency of the aircraft has a substantial impact on the ability of the operator (pilot) to control the aircraft and is expected to result in a significant diminishing of the current rate of in-flight structural failures of these aircraft.

As best seen in FIGS. 2, 3 and 4, the trim element of the present invention is eccentrically mounted with respect to the channel-shaped stabilizer 18, i.e., vertical surface 12 is offset to the port side of the center of channel stabilizer 18 to align with side 28 of channel stabilizer 18, rather than being located in the middle of the channel. In addition, shaft 20 is angularly mounted with its uper portion tilted toward the tail of the aircraft. Thus when trim element 10 is rotated, tab 30 swings to port and upwardly. At the same time, the rear end of element 10 swings to starboard and downwardly.

Bracket arm 24 and a welded extension 25 are connected to vertical surface 12 by means of three fasteners 34a, 34b, 34c, as shown in FIG. 3. Bracket arm 24 is oriented at an angle of approximately 80° with respect to bracket arm 22 to permit vertical surface 12 to align with the left-hand side 28 of the channel-shaped stabilizer and to thereby position surface 14 at approximately a horizontal orientation beneath the aircraft. Extension 25 is welded to arm 24 between fasteners 34a, 34c. The plane of surface 14 is generally aligned with the plane defined by the bottom of channel 18. An aperture 36 is provided in braclet arm 22 for receiving shaft 20, and bracket arm 22 is then secured to shaft 20 by being bolted thereto. Shaft 20 extends upwardly through the hull 38 of the aircraft and attached to the upper end thereof is an arm 40 to which a control cable 42 is attached. Cable 42 extends forwardly within the hull of the aircraft to a point below the cockpit. By means of conventional mechanisms, the control cable 42 is attached to an adjustable vernier-type control on the control panel of the aircraft to provide the pilot of the aircraft with the ability to control the orientation of the trim element.

Upon takeoff, the trim element is typically swiveled to an angle of approximately 45° with respect to the channel-shaped stabilizer and, in this orientation, essentially eliminates the need for the pilot to apply high right-hand rudder pressure which has heretofore been characteristic of the manner in which a Bonanza and other aircraft are operated at takeoff. As the plane climbs and begins to come out at the cruising altitude, the vernier control (not shown) is rotated until the trim element returns to a position, which is essentially a neutral position between approximately 0° and 5° with respect to the longitudinal axis of the aircraft. At normal cruising speeds, the trim element is oriented such that vertical surface 12 is at an angle of approximately 3°-5° relative to the hull of the craft. If the plane should deviate from the setting to which it is trimmed, the trim element forces the airplane to return to its original attitude. The higher the cruising speed chosen for the aircraft, the less the angle of orientation of trim element 10 needed and the more nearly is vertical surface 12 brought into alignment with the left side of the channel-shaped stabilizer.

As seen in FIG. 6, there is shown therein a plan view of trim element 10 as it is stamped from a sheet or plate. In fabrication, portion 12 is bent along line 44 to a orientation of approximately 110° with respect to portion 14. Thereafter, tab 30 is bent downwardly along line 46 to an angle of between approximately 10° and 30° with respect to the remaining portion of surface 14. Finally, corner 32 is bent along line 48 at an angle of between approximately 30° and 60° to complete the molding and shaping of the trim element. It is thereafter attached to bracket 22 by means of fasteners 34 when it is to be mounted in position on the aircraft.

What is claimed is:
1. A two axis trim element for aircraft comprising:
a rotatable shaft extending from the rear portion of the underside of the aircraft;
an elongated, generally horizontal surface element having a downwardly-canted tab portion formed into the leading end thereof extending along the longitudinal axis of the aircraft;
an elongated vertical surface element attached at the port side of the horizontal surface element;
means for securing the vertical surface element to the shaft for swivelly mounting the trim element;
control means extending between the shaft and an operator's control position for enabling an operator to adjust the angle of attack of the trim element; and
an upwardly-canted portion formed into the horizontal surface toward the rear of the starboard side thereof opposite the vertical surface element, said canted portion being angled obliquely relative to the direction of elonation of the horizontal surface whereby the element functions to trim the aircraft about the pitch and yaw axes.

* * * * *